(12) United States Patent
Albrand et al.

(10) Patent No.: US 6,772,610 B1
(45) Date of Patent: Aug. 10, 2004

(54) FLAT GLASS ANNEALING LEHRS

(75) Inventors: Eric Albrand, Nozay (FR); Joël Pasquier, Courtry (FR); Daniel Sevin, Le Mesnil Saint Denis (FR)

(73) Assignee: Stein Heurtey (FR)

( * ) Notice: Subject to any disclaimer, the term of this patent is extended or adjusted under 35 U.S.C. 154(b) by 205 days.

(21) Appl. No.: 10/049,838

(22) PCT Filed: Aug. 3, 2000

(86) PCT No.: PCT/FR00/02242

§ 371 (c)(1),
(2), (4) Date: Feb. 19, 2002

(87) PCT Pub. No.: WO01/14270

PCT Pub. Date: Mar. 1, 2001

(30) Foreign Application Priority Data

Aug. 19, 1999 (FR) .......................................... 99/10644

(51) Int. Cl.[7] .............................................. C03B 25/08
(52) U.S. Cl. .............................. 65/162; 65/348; 65/118
(58) Field of Search ............................ 65/90, 95, 104, 65/117, 118, 119, 162, 175, 194, 254, 349, 348, 351; 34/524; 236/11, 12.14; 264/235, 345, 346

(56) References Cited

U.S. PATENT DOCUMENTS

| | | | | |
|---|---|---|---|---|
| 3,840,360 A | * | 10/1974 | Wright et al. .................. 65/119 |
| 3,884,667 A | * | 5/1975 | Schraven ....................... 65/119 |
| 3,914,118 A | * | 10/1975 | Brooke et al. .................. 65/95 |
| 3,970,037 A | * | 7/1976 | Sopko .......................... 118/729 |
| 3,989,004 A | * | 11/1976 | Scholes ........................ 118/732 |
| 3,997,317 A | * | 12/1976 | Dicks .......................... 65/350 |
| 4,285,451 A | * | 8/1981 | Ferraino ........................ 225/2 |
| 4,481,025 A | * | 11/1984 | Rodriguez et al. ............ 65/348 |
| 5,022,908 A | * | 6/1991 | Honjo et al. .................. 65/268 |
| 5,125,948 A | * | 6/1992 | Vanaschen et al. ........... 65/348 |
| 5,597,394 A | * | 1/1997 | Marique et al. ............. 65/25.2 |
| 5,700,306 A | * | 12/1997 | Maltby et al. ............. 65/182.2 |
| 5,782,949 A | * | 7/1998 | Marique et al. ........... 65/182.2 |
| 5,798,142 A | * | 8/1998 | Soubeyrand .......... 427/255.18 |
| 5,951,734 A | * | 9/1999 | Friedel et al. ................ 65/118 |
| 6,279,350 B1 | * | 8/2001 | Vehmas ....................... 65/114 |

* cited by examiner

Primary Examiner—Steven P. Griffin
Assistant Examiner—Carlos Lopez
(74) Attorney, Agent, or Firm—Connolly Bove Lodge & Hutz LLP

(57) ABSTRACT

Flat glass annealing lehr equipped with controlled heating and cooling means, includes pre-annealing, annealing, and post-annealing zones with heat exchange by radiation, the said zones being equipped respectively with groups of cooling-air heat exchangers situated above and/or beneath the glass ribbon. A single cooling-air intake manifold is included for groups of exchangers in the pre-annealing and annealing zones, which manifold is situated where the zones meet. A single cooling-air intake manifold for second groups of exchanges in the annealing and post-annealing zones, which manifold is situated where said zones meet.

8 Claims, 3 Drawing Sheets

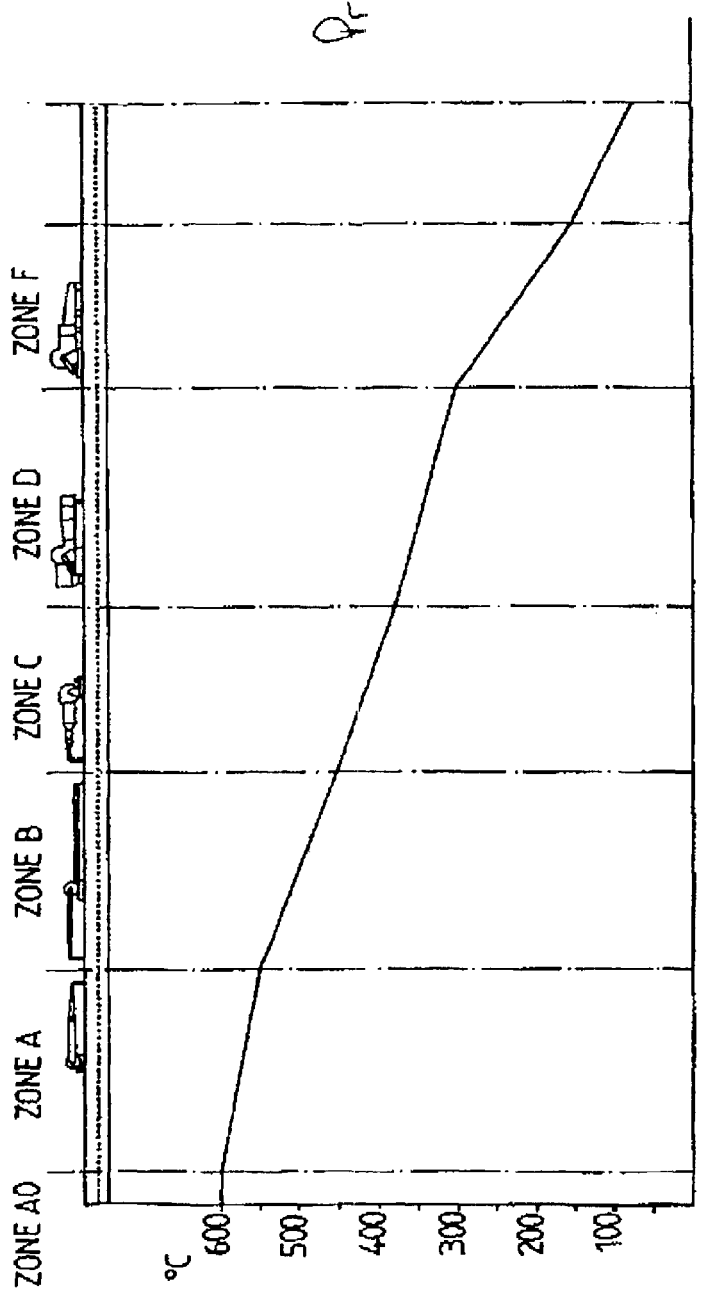
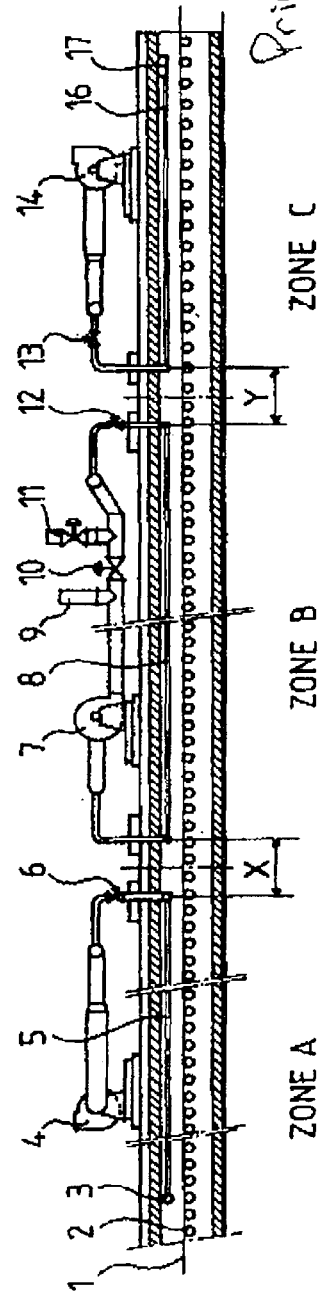
FIG.1 Prior Art
FIG.2 Prior Art

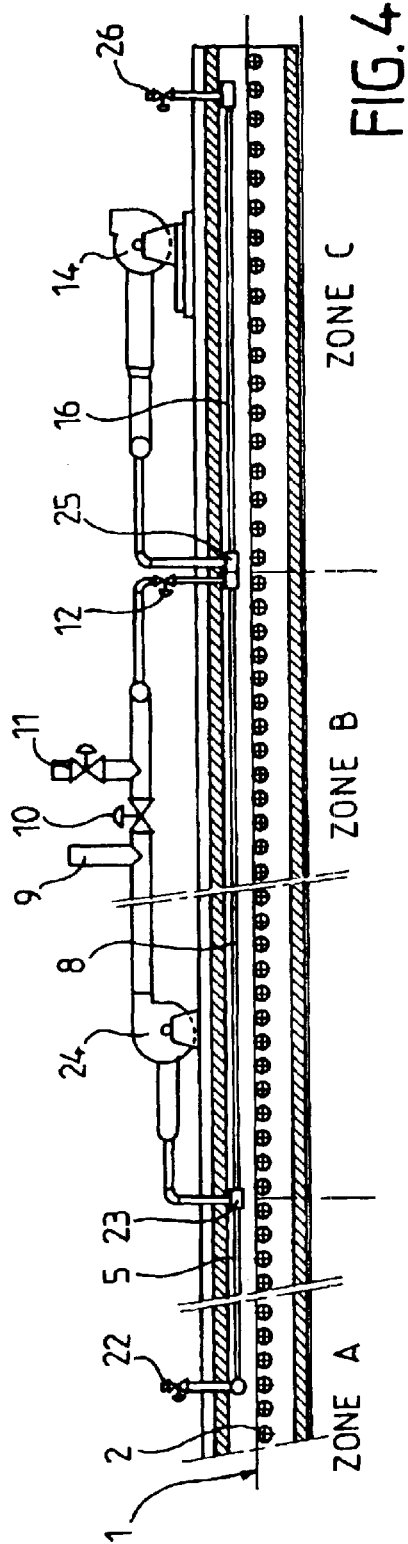
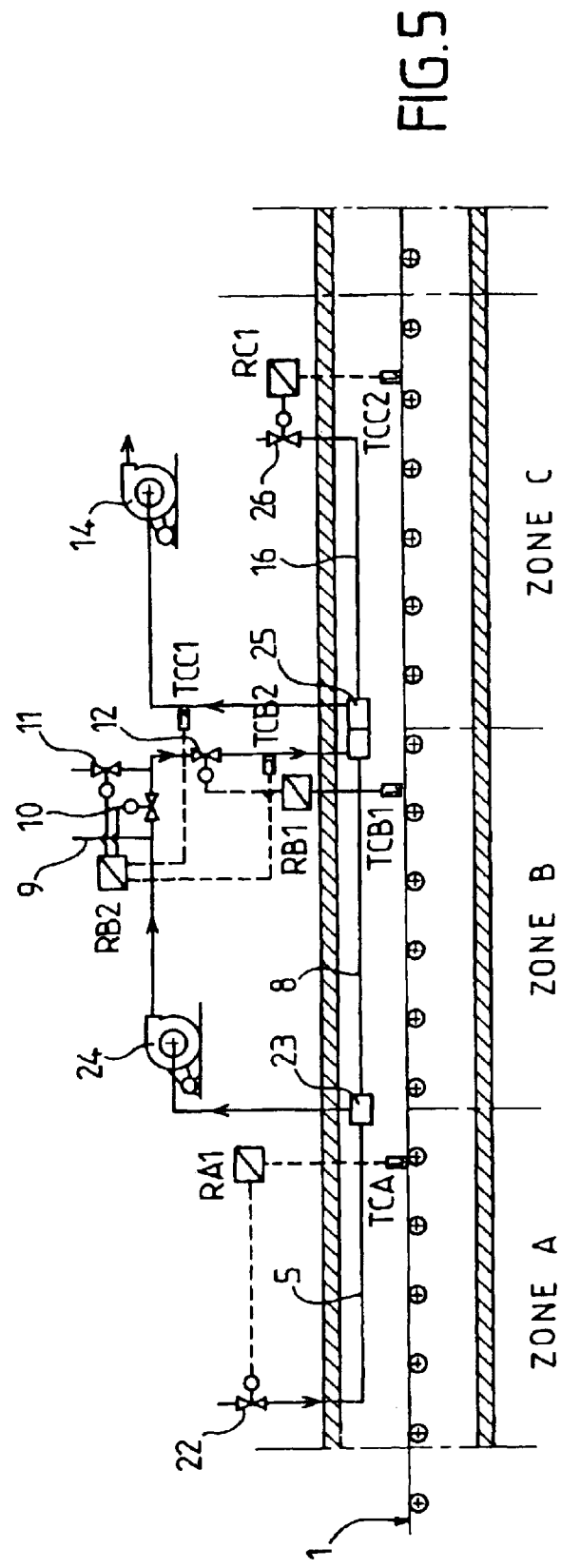

FLAT GLASS ANNEALING LEHRS

FIELD OF THE INVENTION

The present invention relates to improvements made to flat glass annealing lehrs.

BACKGROUND OF THE INVENTION

It is known that flat glass annealing lehrs are tunnel furnaces, equipped with controlled heating and cooling means making it possible to cause the glass ribbon to follow a continuous cooling thermal cycle.

A lehr according to the current state of the art has been depicted schematically in FIGS. 1 and 2 of the appended drawings: FIG. 1 depicts the various zones that make up this lehr and the Curve of the glass annealing thermal cycle which results from it, and FIG. 2 is a section on a longitudinal vertical plane of this lehr.

Referring to FIGS. 1 and 2, it can be seen that the zones of which the lehr is composed are generally defined as follows:
Zone AO: special inlet zone for particular treatment,
Zone A: pre-annealing zone,
Zone B: annealing zone,
Zone C: post-annealing zone,
Zone D: temperate direct cooling zone,
Zone F: final direct cooling zone.

Zones A, B and C are zones in which heat exchange is by radiation and zones D and F are cooling zones in which heat exchange is by convection.

The most critical phase in the cycle of annealing the glass ribbon is in zones A and B in which the glass is in a viscoelastic state allowing the stresses generated in the glass ribbon during the operations of forming it to relax. Poor control over the cooling of the glass ribbon in these zones can give rise to temperature gradients in the glass which will generate stresses which may remain in the form of residual stresses.

Referring to FIG. 2 in which, in this lehr according to the prior art, only the heat exchangers situated above the glass ribbon 1 are depicted (the heating means and the exchangers which are situated beneath this glass ribbon are not depicted in this figure), 2 has been used to depict the system of mechanized rollers which supports and drives the glass ribbon 1 which passes through the lehr.

In zone A, a fan 4 draws in external air at ambient temperature, through a manifold 3 which supplies several groups of exchangers 5 covering the surface of the glass ribbon 1. The exchanger 5 consists of a certain number of groups of tubes of circular, rectangular or some other cross section, arranged across the width of the glass ribbon so as to vary the cooling across the width of this ribbon. The air flow rate drawn into each group of exchanger tubes 5 is regulated via a series of valves such as 6 which are installed upstream or downstream of each group of exchanger tubes 5 and the degree of opening of which allows the cooling air flow rate to be adjusted according to the target temperature set at the end of the zone A.

In zone B, a fan 7 recirculates air through several groups of exchanger tubes 8 distributed across the width of the glass ribbon 1. The temperature of the recirculated air in the groups of exchangers 8 can be adjusted by providing a hot air exhaust through the manifold 9 and by regulating some valves such as 10 and 11 which control the dilution of ambient air in the recirculated air. The air flow rate passing through each group of exchangers 8 can be adjusted via valves such as 12 which are installed upstream or downstream of each group of exchanger tubes 8 and the degree of opening of which allows the cooling air flow rate to be adjusted according to the target temperature fixed at the end of this zone B.

In zone C, a fan 14 draws in external air at ambient temperature through a manifold 17 which supplies several groups of exchanger tubes 16 covering the surface of the glass ribbon 1. The air flow rate drawn into each group of exchangers 16 is regulated via a series of valves such as 13 installed upstream or downstream of each group of exchanger tubes 16, according to the target temperature for the end of this zone C.

All the air temperatures and flow rates of air passing through the groups of exchangers in zones A, B and C are controlled by a regulating system operating each valve such as 6, 10, 11, 12 and 13, on the basis of information transmitted by temperature sensors which are installed at the end of each zone and across the width of the glass ribbon.

A study of FIG. 2 reveals that the obligation for the ducts connecting the exchanger tubes where zones A and B and where zones B and C meet to pass through the roof of the lehr, the bulk of the valves such as 6, 12, 13, and the need to provide means for compensating for the expansion of the exchanger tubes (not depicted in the figure), make it essential to separate the groups of exchangers of zones A, B and C by distances denoted by the references X and Y in FIG. 2 and known as inter-zone regions. The length of the inter-zone regions is generally of the order of 1.5 meters.

It can be seen that over the distance of the inter-zone regions x and Y, the glass strip is not subjected to the controlled radiation of the exchangers. It is therefore evident that its cooling is not controlled during the time needed for the glass ribbon to cover these inter-zone regions. In consequence, the temperature curve does not have an even profile while the glass ribbon is passing through these inter-zone regions X and Y. The glass, in these inter-zone regions, is at a temperature level which corresponds to a critical viscoelastic state. This non-uniformity of the glass ribbon cooling curve generates stresses in this glass which may remain right up to the end of cooling, in the form of residual stresses.

FIG. 3 of the appended drawings shows the temperatures of the glass ribbon and of the air passing through the exchanger tubes of zones A, B and C and over the length of the inter-zone regions X and Y. Curve 18 shows the change in glass ribbon skin temperature and curves 19, 20 and 21 shows that of the temperature of the air passing through the exchanger tubes in each zone.

The glass ribbon skin temperature (curve 18) decreases between the entries and exits of zones A, B and C:
In the case of Zone A: between points A and B;
In the case of Zone B: between points C and D;
In the case of Zone C: between points E and F.

A study of curves 19, 20 and 21 shows that the temperature of the air passing through the exchanger tubes:
In the case of Zone A: increases between points J and K;
In the case of Zone B: increases between points M and L;
In the case of Zone C: increases between points O and N.

As the inter-zone regions X and Y are not controlled, an increase in the glass ribbon skin temperature occurs therein. These increases in temperature are represented by the curve 18:
The inter-zone region for Zone A and Zone B, between the points B and C,
The inter-zone region for Zone B and Zone C, between the points D and E.

This lack of control over the heat exchange at the inter-zone regions X and Y disturbs the glass ribbon cooling curve in a range of temperatures that correspond to the viscoelastic domain, and this may give rise to the appearance of stresses, some of which will remain after total cooling, to the detriment of the quality of the glass produced.

It will be appreciated that the temperature difference of the glass in the inter-zone regions X and Y, for a given setting of the lehr, will vary according to the thickness of the glass ribbon or according to the speed at which it travels, which is dependent on the production of the line.

The present invention sets out to provide a solution to the technical problem mentioned hereinabove by eliminating the discontinuity in the glass ribbon annealing curve, which discontinuity is generated by the presence of the inter-zone regions X and Y in the lehrs according to the current state of the art, this being so as to improve appreciably the quality of the end product.

In consequence, the present invention relates to a flat glass annealing lehr equipped with controlled heating and cooling means comprising, in particular, pre-annealing, annealing, and post-annealing zones with heat exchange by radiation and temperature direct cooling zones and final direct cooling zones with heat exchange by convection, the said zones being equipped respectively, with groups of cooling-air heat exchangers situated above and/or beneath the glass ribbon, characterized in that it comprises:

a single cooling-air intake manifold for a first group of exchangers in the pre-annealing and annealing zones, which manifold is situated where the zones meet, and a single cooling-air intake manifold for a second group of exchangers in the annealing and post-annealing zones, which manifold is situated where the zones meet.

According to the present invention, the single manifold located where the annealing and post-annealing zones meet may be produced in the form of ducts, divided vertically into two sections to which the groups of exchange of the annealing zone and those of the post-annealing zone are connected.

The present invention is also aimed at a system for controlling the temperature of the cooling air on intake to the annealing zone and on discharge from the post-annealing zone, this possibility of regulating the lehr allowing the temperatures of the cooling air passing through the groups of exchangers to be optimized, thus making it possible to obtain the ideal cooling curve for the glass ribbon passing through the lehr. This result is obtained according to the invention irrespective of the thickness of the glass ribbon and of the production of the line.

Other features and advantages of the present invention will become apparent from the description given hereinafter with reference to FIGS. 4 and 5 of the appended drawings, in which:

BRIEF DESCRIPTION OF THE DRAWINGS

FIG. 1 is a plot of a glass annealing thermal cycle through zones of a lehr.

FIG. 2 is a simplified view of a lehr.

FIG. 4 is a schematic depiction similar to FIG. 2, of a flat glass annealing lehr equipped with the improvements which are the subject of the present invention, and FIG. 5 illustrates the control system provided on the lehr illustrated by FIG. 4.

Figure 3:
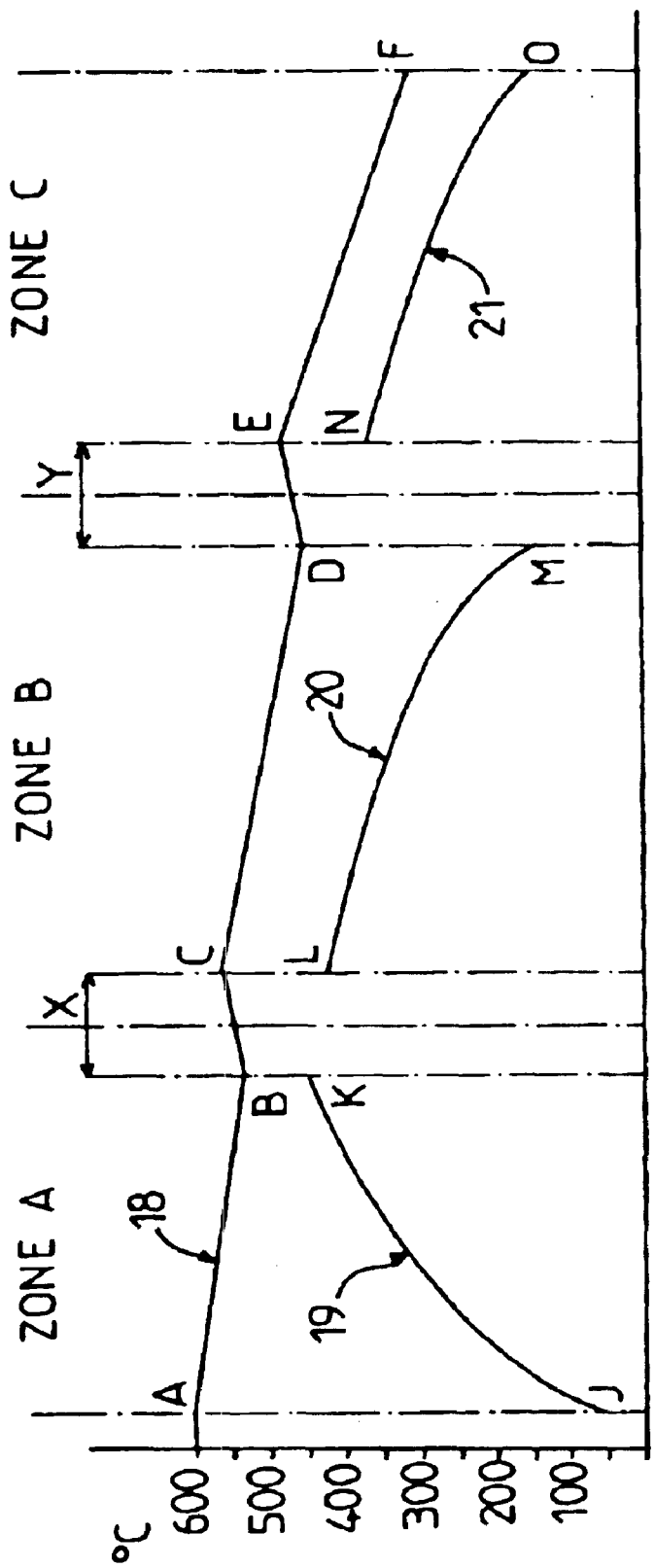
FIG. 3 is a temperature plot of glass ribbon and air in a lehr.

We refer first of all to FIG. 4 which illustrates a preferred but non-limiting embodiment of the subject of the invention. This figure again shows the zones A, B and C of FIG. 2, together with the various elements that make up the systems for heat exchange by radiation, described hereinabove, these elements being given the same references as those used in FIG. 2.

According to the present invention, the fan in zone A has been eliminated and the tubes of the groups of exchangers 5 have been connected to a single manifold 23. Likewise, the exchanger tubes 8 of the zone B are also connected to this same manifold 23, the latter being situated where the zones A and B meet. The manifold 23 is connected to the intake of a fan 24 installed, for example, in zone B, and which draws in air that passes through the exchanger tubes 5 of zone A and through the exchanger tubes 8 of zone B.

Thanks to this arrangement, the inter-zone region X, where the zones A and B meet in lehrs according to the prior art, and in which the glass ribbon 1 was not correctly cooled, is eliminated. Thus, by virtue of the invention, control of the glass ribbon cooling curve is continuous, thus eliminating any risk of additional stresses appearing in the glass, which stresses might remain in the end product.

In order to eliminate the discontinuity of annealing in the inter-zone region Y between the zones B and C of installations according to the prior art, the invention envisages a single cooling air intake manifold 25 for the groups of exchangers of zones B and C, this single manifold 25 being situated where the zones B and C meet. According to the present invention, this manifold can be produced in the form of a duct divided vertically in its cross section by a partition, and to which, on the zone B side, the groups of exchangers 8 are connected and, on the zone C side, the groups of exchangers 16 are connected.

Thanks to this arrangement, it is possible to obtain perfect smoothing of the glass ribbon annealing curve throughout the range of temperatures for which this ribbon is in a critical viscoelastic state and for which it is exposed to exchange by radiation in the zones A, B and C, characterized by:

In the case of zone A: antimethodic exchange: cold air parallel current—the air flows through the groups of exchangers parallel to the direction of travel of the glass ribbon;

In the case of zone B: methodic exchange: recirculated hot air countercurrent—the air flows through the groups of exchangers in the opposite direction to the direction of travel of the glass ribbon;

In the case of zone C: methodic exchange: cold air countercurrent—the air flows through the groups of exchangers in the opposite direction to the direction of travel of the glass ribbon.

The invention is also aimed at a control and regulating system which is illustrated in FIG. 5. This system has the following features:

Zone A:

One or more temperature sensors are provided, these consisting, for example, of thermocouples such as TCA, situated at the end of zone A and which measure the temperature of the glass ribbon as it leaves this zone. These temperature sensors are connected to a temperature regulator RA1 having, as its reference point, the desired temperature for the end of zone A and which act on a series of motorized valves 22 regulating the flow rate of cold air passing through each of the groups of exchanger tubes 5 in this zone.

Zone B:

This also comprises one or more temperature sensors, consisting for example of thermocouples such as TCB1 situated at the end of zone B and which measure the temperature of the glass ribbon as it leaves this zone. These temperature sensors are connected to a temperature regulator RE1 having, as its reference point, the desired temperature for the end of zone B and which act on a series of motorized valves 12 regulating the flow rate of air recirculated through each group of exchangers in this zone.

This zone also comprises means for controlling and regulating the temperature of the recirculated air passing through the groups of exchangers 8. These means consist of temperature sensors such as thermocouples TCB2 installed in the inlet ducts of the groups of exchangers 8 and a temperature regulator RB2 to which the temperature sensors are connected and which receives its temperature reference point from a thermocouple TCC1 installed in the intake duct of the fan 14 of zone C so as to regulate the temperature of the air at the inlet to the exchangers 8, via the regulating valves 10 and 11.

As in the lehr illustrated by FIG. 3, in the case of the lehr illustrated in FIG. 4, the temperature of the air recirculated through the groups of exchangers 8 is adjusted by a discharge of air through the manifold 9 and by regulating the valves 10 and 11 controlling the dilution of ambient air in the recirculated air.

Zone C:

This zone also comprises one or more temperature sensors such as, for example, thermocouples TCC2, situated at the end of zone C so as to measure the temperature of the glass ribbon leaving this zone. These temperature sensors are connected to a temperature regulator RC1 having, as its reference point, the desired temperature for the end of zone C and acting on a series of motorized valves 26 which regulate the flow rate of air recirculated through each group of exchangers 16 of this zone C.

The temperature measurements taken by all the temperature sensors in each of the zones concerned allow the lehr control system to adapt the temperatures and flow rates of air in the exchangers of each zone so as to obtain a glass ribbon temperature curve similar to the theoretical annealing curve.

Each group of exchangers arranged transversely on the glass ribbon in each of the zones A, B and C makes it possible to control the cooling of this ribbon across its width, for example to encourage more cooling of its centre compared with its edges.

According to the present invention, the regulators employed in this control system may be of the conventional type or may alternatively be built into a regulating system employing algorithms of the fuzzy logic or neuro-predictive type.

Of course, the present invention is not restricted to the exemplary embodiments described and/or depicted but encompasses all variants thereof. Thus, it is obvious to the person skilled in the art that the device that is the subject of the invention, an application of which has been described hereinabove in the case of exchangers positioned above the glass ribbon, can apply not only to these but also, and at the same time, to exchangers situated above and beneath the glass ribbon.

What is claimed is:

1. A flat glass ribbon annealing lehr, including pre-annealing, annealing and post-annealing zones defined along an internal chamber of the lehr, and comprising:
    groups of cooling-air heat exchangers, producing heat exchange by radiation, selectively situated above and/or beneath the glass ribbon, within the internal lehr chamber and located in each of corresponding zones;
    a first single cooling-air intake manifold connected to groups of exchangers in the pre-annealing and annealing zones, which manifold is situated where the pre-annealing and annealing zones meet; and
    a second single cooling-air intake manifold connected to groups of exchangers in the annealing and post-annealing zones, which manifold is situated where the annealing and post-annealing zones meet.

2. A lehr according to claim 1, wherein the second single manifold exists in the form of ducts, divided vertically into two sections to which the annealing and post-annealing exchangers are connected.

3. A lehr according to claim 1, wherein a single fan is installed in the annealing zone and which draws in air that flows through the groups of exchangers of the pre-annealing and annealing zones.

4. A lehr according to claim 1, together with means for controlling the temperature of cooling air on intake to the annealing zone and on discharge from the post-annealing zone.

5. A lehr according to claim 4, wherein the temperature-control system comprises:
    at least one first temperature sensor situated at the end of the pre-annealing zone;
    a first temperature regulator to which the fist temperature sensor is connected and which has, as its reference point, the desired temperature for the end of pre-annealing zone;
    a first plurality of motorized valves actuated by the first regulator and which regulate the air flow rate passing through each group of exchangers of the pre-annealing zone;
    at least one second temperature sensor situated at the end of the annealing zone;
    a second temperature regulator to which the second temperature sensor is connected and which has, as its reference point, the desired temperature for the end of the annealing zone;
    a second plurality of motorized valves actuated by the said second regulator and which regulate the flow rate of air circulated through each group of exchangers of the annealing zone;
    means for controlling the temperature of the recirculating air passing through the exchangers of the annealing zone and which includes at least one third temperature sensor installed in first inlet ducts of the annealing zone exchangers, a third temperature regulator receiving its temperature reference point from a fourth temperature sensor installed in second inlet ducts of the annealing zone exchangers and regulating the air temperature on inlet into the annealing zone exchangers via regulating valves;
    at least one fifth temperature sensor located at the end of the post-annealing zone;
    a fourth temperature regulator to which the fifth sensor is connected and which has as its reference point the desired temperature for the end of the post-annealing zone; and a
    a third plurality of motorized valves regulating the air flow rate circulated through the post-annealing exchangers.

6. A lehr according to claim 5, wherein the temperature control means, on the basis of temperature measurements taken by all of the temperature sensors of each of the three zones, adapts the temperatures and the flow rates of air in all of the exchangers of the three zones so as to obtain a glass ribbon temperature curve simulating a preselected theoretical annealing curve.

7. A lehr according to one of claims 5, wherein all the regulators arm built into a centralized regulating system employing algorithms of the fuzzy logic type.

8. A lehr according to claims 5, wherein all the regulators are built into a centralized regulating system employing neuro-predictive algorithms.

* * * * *